(12) United States Patent
Solis

(10) Patent No.: US 7,859,391 B1
(45) Date of Patent: Dec. 28, 2010

(54) AUXILIARY BRAKE LIGHT SYSTEM FOR AUTOMOBILES AND ASSOCIATED METHOD

(76) Inventor: Jose Solis, 1004 W. Covina Pkwy., Suite 122, West Covina, CA (US) 91790

( * ) Notice: Subject to any disclaimer, the term of this patent is extended or adjusted under 35 U.S.C. 154(b) by 359 days.

(21) Appl. No.: 12/221,758

(22) Filed: Aug. 6, 2008

Related U.S. Application Data

(60) Provisional application No. 60/997,973, filed on Oct. 9, 2007.

(51) Int. Cl.
*B60Q 1/00* (2006.01)

(52) U.S. Cl. .................... 340/435; 340/436; 340/425.5; 340/467; 340/468; 340/479; 340/903; 701/35; 701/45; 701/301

(58) Field of Classification Search ................ 340/435, 340/436, 425.5, 467, 468, 479, 903; 342/70, 342/71; 180/167, 170; 701/35, 45, 301
See application file for complete search history.

(56) References Cited

U.S. PATENT DOCUMENTS

| | | | |
|---|---|---|---|
| 4,600,913 A | * | 7/1986 | Caine ......................... 340/435 |
| 5,684,474 A | * | 11/1997 | Gilon et al. .................. 340/903 |
| 6,240,346 B1 | * | 5/2001 | Pignato ....................... 701/35 |
| 6,249,219 B1 | | 6/2001 | Perez |
| 6,351,211 B1 | | 2/2002 | Bussard |
| 6,411,204 B1 | | 6/2002 | Bloomfield |
| 7,123,168 B2 | * | 10/2006 | Schofield .................... 340/937 |
| 2002/0140551 A1 | * | 10/2002 | Gutta et al. ................. 340/435 |

* cited by examiner

*Primary Examiner*—Hung T. Nguyen

(57) ABSTRACT

An automated leading-vehicle message warning system for notifying a trailing vehicle of an unsafe traveling condition preferably includes a vehicle speedometer sensor and a vehicle brake system sensor. The warning system also may include a mechanism for determining whether a real-time traveling condition between the leading and trailing vehicles is a safe traveling condition by detecting whether the trailing vehicle is traveling at a minimum safe linear distance directly behind the leading vehicle upon receipt of input signals from a speedometer sensor and a vehicle brake system sensor. The warning system may also include a plurality of transducers housed in the leading vehicle that may be selectively toggled to respective activate modes such that each of the transducers generates and transmits a unique warning signal when the trailing vehicle fails to maintain the minimum safe distance from the leading vehicle during the unsafe traveling condition.

13 Claims, 5 Drawing Sheets

AUXILIARY BRAKE LIGHT SYSTEM FOR AUTOMOBILES AND ASSOCIATED METHOD

CROSS REFERENCE TO RELATED APPLICATIONS

This application claims the benefit of U.S. Provisional Application No. 60/997,973, filed Oct. 9, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to automobile warning systems and, more particularly, to an automated leading-vehicle message warning system for notifying a trailing vehicle of an unsafe traveling condition.

2. Prior Art

As highways and other roadways become more crowded, especially during rush hour periods, the potential for multi-car accidents has increased. Most of these accidents can be attributed to drivers in vehicles not being able to adequately assess how fast the vehicles in front of them are braking. When a driver applies his brakes, other drivers have no way of knowing how forcefully that person is braking. Under the best conditions, it requires excellent depth perception to determine how quickly a car is decelerating. Many rear-end collisions could be prevented with a visual warning system that would allow a driver to accurately determine how fast the vehicle in front of him is braking. Braking warning devices have been described in the art that provide this capability by a variety of different mechanisms. Many of these devices, however, do not provide the degree of resolution to aptly characterize the severity of braking, and in some cases, are susceptible to the vehicle's attitude (i.e. ascending or descending a hill).

U.S. Pat. No. 6,249,219 to Perez discloses a severe braking warning system for a vehicle wherein the system is designed to measure a vehicle's rate of motion and, upon deceleration of the vehicle, affect the vehicle's brake light circuit by switching it on and off at a pulse rate proportional to the severity of deceleration. The system comprises an accelerometer, a microprocessor (either an integrated unit or the vehicle's existing unit), transistor, and a switch in communication with the vehicle's existing brake light circuit. The inventive brake light warning system provides a supplemental indication to other vehicles traveling behind of the rate of braking, thereby reducing the possibility of rear-end collisions. Unfortunately, this prior art reference does not provide a warning when a trailing vehicle is traveling too closely while maintaining a steady speed on the road.

U.S. Pat. No. 6,351,211 to Bussard discloses a brake strobe system providing a visual warning system designed to prevent accidents and multi-car pileups. When a driver quickly and forcefully applies his brakes, a strobe light is activated. The harder a driver brakes, the faster and brighter the strobe blinks, thereby warning other drivers of potential hazards. The system also has the ability to brighten or dim the strobe to compensate for weather and day or night driving conditions. It also has the ability to change modes or presets according to the speed of the vehicle. In the event that a car's airbag deploys, the brake strobe system will automatically activate to warn other drivers and alert emergency response personnel. Unfortunately, this prior art reference employed in the existing brake lights may not adequately warn trailing drivers who are not familiar with the system and who may mistake the blinking lights as simply the driver tapping the breaks repeatedly.

U.S. Pat. No. 6,411,204 to Bloomfield discloses an anti-collision safety light control for a vehicle including a microprocessor which receives one or more inputs and controls an output of at least one indicator or signaling device in response to the inputs. The microprocessor is continuously powered or energized when the vehicle is in use, such that the indicator may be modulated in situations when the brake pedal of the vehicle is not applied. Preferably, an accelerometer may be included with the safety light system to provide a deceleration signal to the microprocessor, which may determine whether the deceleration is at or above one or more threshold levels and correspondingly modulate the indicator in accordance with the particular threshold level encountered. The microprocessor may modulate the indicator independent of actuation of the brake pedal by a driver of the vehicle. However, this prior art reference does not provide a light-emitting diode message display system that sequentially illuminates selected diodes for generating a warning message to more adequately warn the trailing vehicle.

Accordingly, a need remains for an automated leading-vehicle message warning system in order to overcome the above-noted shortcomings. The present invention satisfies such a need by providing a system that is convenient and easy to use, is durable yet lightweight in design, is versatile in its applications, and provides a means for greatly reducing the number of rear-end collisions currently plaguing the American roadways. The safety benefits afforded by the present invention can effectively and advantageously be used on cars, trucks and motorcycles, a vast potential market. The system is also connected to the hazard light system or the turn signal which effectively alerts traffic of the presence of the disabled vehicle effectively for safety purposes.

BRIEF SUMMARY OF THE INVENTION

In view of the foregoing background, it is therefore an object of the present invention to provide a system for warning drivers that they are traveling too closely to the vehicle in front of them, or that the vehicle in front is rapidly coming to a stop. These and other objects, features, and advantages of the invention are provided by an auxiliary brake light system for automobiles and the like.

An automated leading-vehicle message warning system for notifying a trailing vehicle of an unsafe traveling condition preferably includes a vehicle speedometer sensor for generating and transmitting true and false first input signals indicating whether a real-time traveling speed of the leading-vehicle is above or below a maximum safe traveling speed respectively. The warning system further may include a vehicle brake system sensor for generating and transmitting true and false second input signals indicating whether the leading vehicle is decelerating and accelerating respectively.

The warning system also may include a mechanism for determining whether a real-time traveling condition between the leading and trailing vehicles is a safe traveling condition by detecting whether the trailing vehicle is traveling at a minimum safe linear distance directly behind the leading vehicle upon receipt of the true first and second input signals. This allows the driver to focus on the road ahead while the system monitors the distance of an approaching vehicle and activates the warning system accordingly.

Additionally, the warning system may include a plurality of transducers housed at the leading vehicle that may be selectively toggled to respective activate modes such that each of the transducers generates and transmits a unique warning signal when the trailing vehicle fails to maintain the minimum safe distance from the leading vehicle during the unsafe traveling condition. Such a warning signal can be of various types, examples of which may include circular lights attached to the rear windshield, lighted indicia displaying a warning message, or an audible alarm.

The safe traveling condition determining mechanism preferably includes a logic gate communicatively coupled directly to the vehicle speedometer sensor and the vehicle brake system sensor respectively. Such a logic gate generates and transmits a true first output signal upon receipt of the true first signal and the true second signal respectively. The logic gate may further generate and transmit a false first output signal upon receipt of either of the false first signal and the false second signal respectively. The logic gate acts to take over the warning system for the driver, allowing the driver to focus attention on operating the vehicle safely.

The condition determining mechanism also may include a distance-detecting sensor for generating and transmitting a second output signal indicating a real-time linear distance between the leading and trailing vehicles when the real-time traveling speed is above the maximum safe traveling speed. The distance-detecting sensor prevents the driver from having to make safe distance judgments, a calculation that can often be difficult while looking in rear view mirrors, or dangerous if the driver turns their head to see the how close the vehicle is trailing. Further, the condition determining mechanism may include a processor communicatively coupled directly to the logic gate and the distance-detecting sensor respectively. Additionally, the condition determining mechanism may include a memory communicatively coupled to the processor. Such a memory preferably includes programmable software instructions that instruct the transducers to sequentially alert the trailing vehicle of the unsafe driving condition.

The software instructions may include and execute a control logic algorithm preferably including the first step of requesting receipt of the first output signal from the logic gate. Second, the algorithm may request receipt of the second output signal from the distance-detecting sensor. The third step is preferably verifying whether the first output signal is true. If the output signal in the third step is true, the fourth step preferably entails the algorithm verifying whether the real-time linear distance is less than the minimum safe linear distance. If the distance is less than the minimum safe linear distance in step four, the fifth step may include the algorithm generating and transmitting first and second alert signals to the transducers for emitting respective audible and visual warning signals to instruct the trailing vehicle to slow down. At the same time, the algorithm may generate and transmit an activation signal to the video-recording system for capturing a real-time video of the trailing vehicle while the real-time linear distance remains less than the minimum safe linear distance. This allows the driver to monitor the trailing vehicle without turning their head or relying on rearview mirrors.

The control logic algorithm may further include the chronological steps of first calculating a period of time in which the real-time linear distance is less than the minimum safe linear distance. Such minimum safe linear distance preferably is predefined based upon real-time driving and weather conditions respectively. If the period of time is greater than a maximum time interval, the second step of the algorithm may then include generating and transmitting third and fourth alert signals to the transducers for emitting additional audible and visual warning signals instructing the trailing vehicle to slow down. These additional warnings ensure that the trailing vehicle is aware of the posed danger of driving too closely to the leading vehicle. The maximum time interval preferably is predefined based upon the real-time driving and weather conditions respectively.

The transducers may further include a light-emitting diode message display system that sequentially illuminates selected diodes for generating a warning message that is visible to the trailing vehicle. Such a warning message may include short phrases directing the trailing vehicle to slow down or increase the distance between vehicles. Additionally, the transducers may include a speaker for generating a pre-recorded audible warning message that is identifiable by the trailing vehicle. The audible warning may assist a trailing vehicle's driver who may not understand the visual warning.

Further, the automated leading-vehicle message warning system may include a change in the minimum safe linear distance being directly proportional to a change in the maximum safe traveling speed. This preferably allows an increase and a decrease in the maximum safe traveling speed to cause an increase and a decrease in the minimum safe linear distance respectively.

It is an additional intention of the present invention to provide a method for notifying a trailing vehicle of an unsafe traveling condition behind a leading vehicle. Such a method preferably includes the chronological step of first providing a vehicle speedometer sensor. Next, the method may include the vehicle speedometer sensor generating and transmitting true and false first input signals indicating whether a real-time traveling speed of the leading-vehicle is above or below a maximum safe traveling speed respectively. Third, the method may include providing a vehicle brake system sensor preferably to monitor when the brakes are depressed and suddenness of the driver's pressing them.

Fourth, the method preferably includes the step of the vehicle brake system sensor generating and transmitting true and false second input signals indicating whether the leading vehicle is decelerating and accelerating respectively. A following step may include providing and housing a plurality of transducers within the leading vehicle. The sixth step may include determining whether a real-time traveling condition between the leading and trailing vehicles is a safe traveling condition by detecting whether the trailing vehicle is traveling at a minimum safe linear distance directly behind the leading vehicle upon receipt of the true first and second input signals. If the real-time traveling conditions are not safe, an additional step of the method may be to then selectively toggle the transducers to respective activate modes. Finally, the method may include each of the transducers generating and transmitting a unique warning signal when the trailing vehicle fails to maintain the minimum safe distance from the leading vehicle during the unsafe traveling condition.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
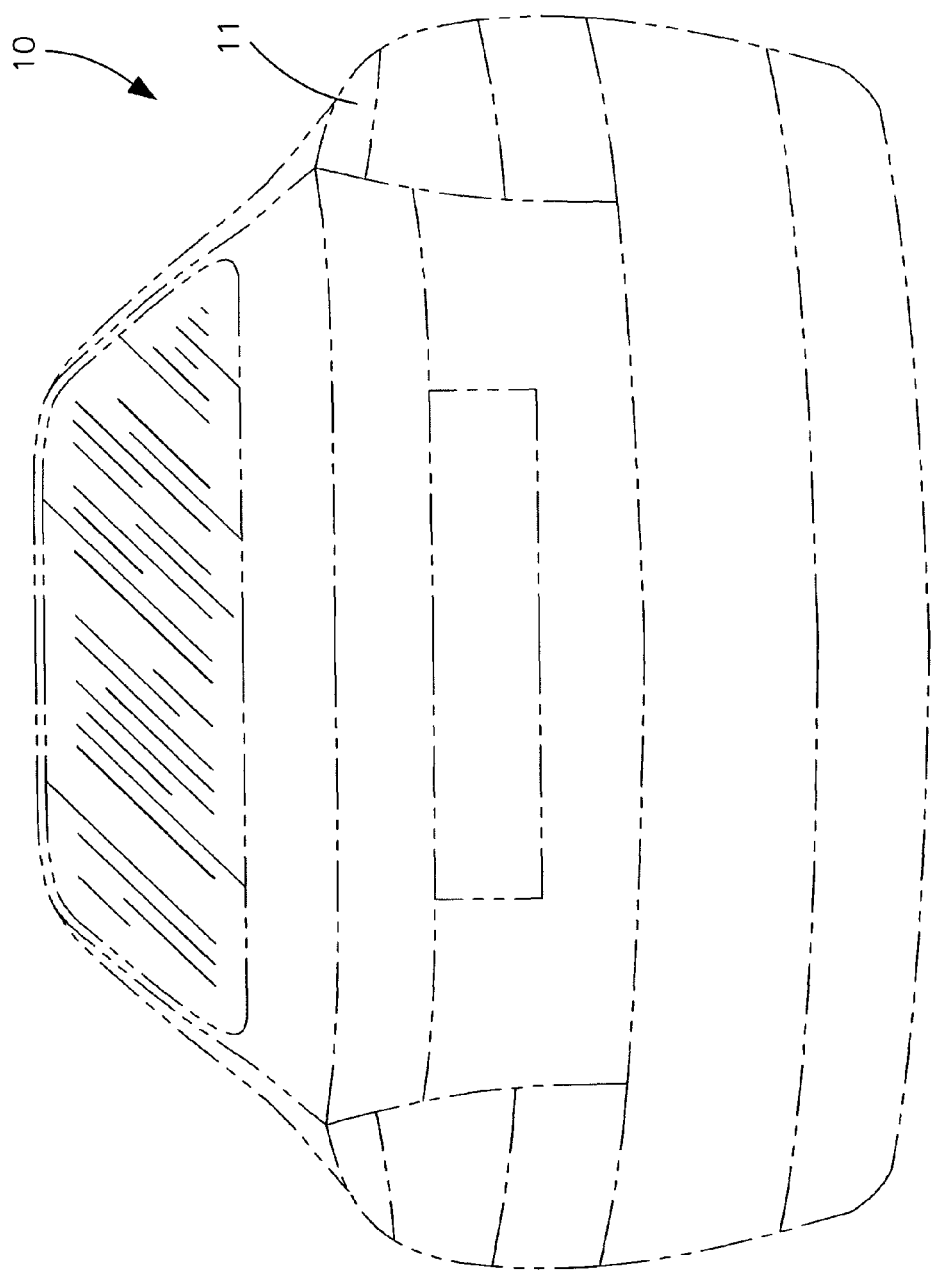
FIG. 1 is a rear elevational view of the leading vehicle employing the automated leading-vehicle message warning system in a deactivated mode, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide an automated leading-vehicle message warning system. It should be understood that the system 10 may be used for notifying a trailing vehicle of many different types of unsafe traveling conditions and should not be limited in use to the applications mentioned herein. The present invention may also be adapted and employed in many different types of vehicles.

Referring initially to FIGS. 1-5, an automated leading-vehicle message warning system 10 for notifying a trailing vehicle of an unsafe traveling condition preferably includes a vehicle speedometer sensor 20 for generating and transmitting true and false first input signals 21 indicating whether a real-time traveling speed of the leading-vehicle 11 is above or below a maximum safe traveling speed respectively. The warning system 10 further may include a vehicle brake system sensor 22 for generating and transmitting true and false second input signals 23 indicating whether the leading 11 vehicle is decelerating and accelerating respectively.

Figure 4:
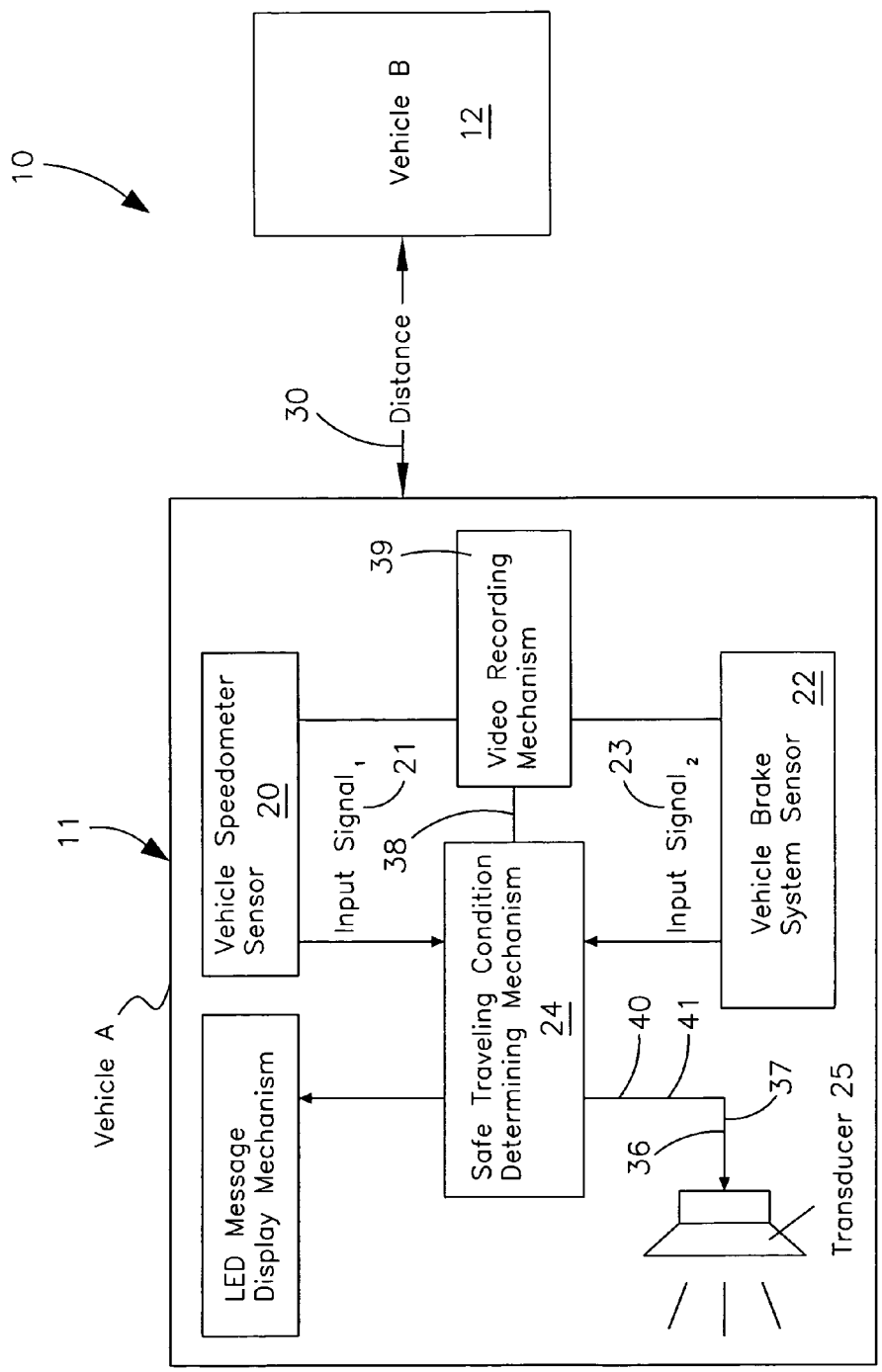
FIG. 4 is a high-level schematic block diagram showing the interrelationship between the major electrical components of the present invention.
Figure 5:
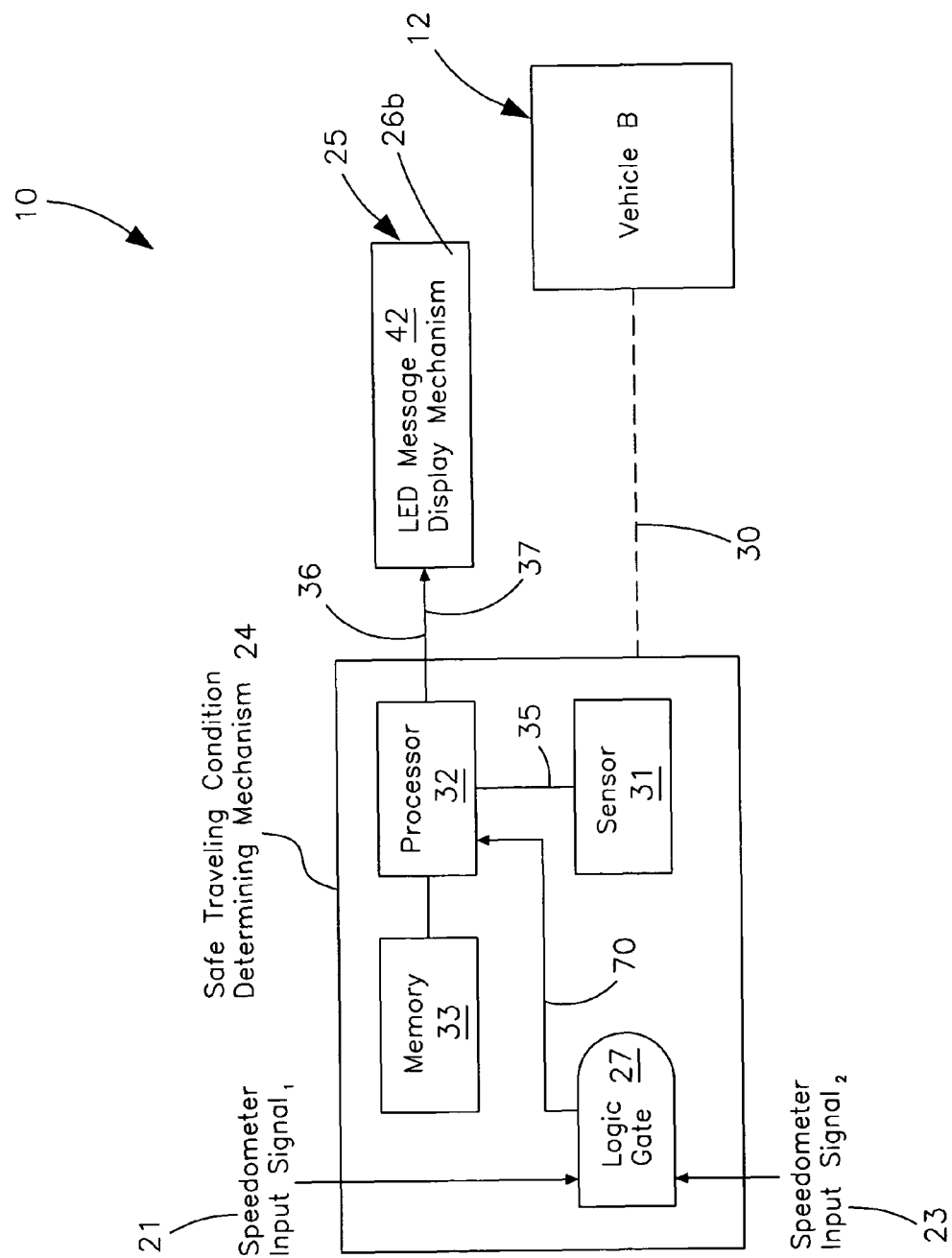
FIG. 5 is a schematic block diagram of the safe traveling condition determining mechanism.

Referring to FIGS. 4 and 5, the warning system 10 also may include a mechanism 24 for determining whether a real-time traveling condition between the leading 11 and trailing 12 vehicles is a safe traveling condition by detecting whether the trailing vehicle 12 is traveling at a minimum safe linear distance 30 directly behind the leading vehicle upon receipt of the true first 21 and second 23 input signals. This allows the driver to safely focus on the road ahead while the system monitors the distance 30 of an approaching vehicle and activates the warning system accordingly.

Additionally, the warning system 10 may include a plurality of transducers 25 housed at the leading vehicle 11 that may be selectively toggled to respective activate modes such that each of the transducers 25 generates and transmits a unique warning signal 26 when the trailing vehicle 12 fails to maintain the minimum safe distance 30 from the leading vehicle during the unsafe traveling condition. Such a warning signal 26 can be of various types (explained below), examples of which may include circular lights attached to the rear windshield, lighted indicia displaying a warning message, or an audible alarm.

Referring to FIGS. 4 and 5, the safe traveling condition determining mechanism 24 preferably includes a logic gate 27 communicatively coupled directly without the use of intervening parts to the vehicle speedometer sensor 20 and the vehicle brake system sensor 22 respectively. Such a logic gate 27 generates and transmits a true first output signal 70 upon receipt of the true first 21 signal and the true second 23 signal respectively. The logic gate 27 may further generate and transmit a false first 70 output signal upon receipt of either of the false first 21 signal and the false second 23 signal respectively. This is vital so that the system condition determining mechanism 24 may anticipate the real rate of speed with consideration to any brake pressure being applied by the user. In this manner, the logic gate 27 acts to take over the warning system 10 for the driver, allowing the driver to focus attention on operating the vehicle safely.

Referring to FIGS. 4 and 5, the condition determining mechanism 24 also may include a distance-detecting sensor 31 for generating and transmitting a second output signal 35 indicating a real-time linear distance 30 between the leading 11 and trailing 12 vehicles when the real-time traveling speed is above the maximum safe traveling speed. The distance-detecting sensor 31 prevents the driver from having to make safe distance judgments, a calculation that can often be difficult while looking in rear view mirrors, or dangerous if the driver turns their head to see the how close the vehicle is trailing. Further, the condition determining mechanism 24 may include a processor 32 communicatively coupled directly without the use of intervening parts to the logic gate 27 and the distance-detecting sensor 31 respectively.

Additionally, the condition determining mechanism 24 may include a memory 33 communicatively coupled to the processor 32. Such a memory 33 preferably includes programmable software instructions that instruct the transducers 25 to sequentially alert the trailing vehicle of the unsafe driving condition. The elements, as claimed, provide a safe and effective means for the user to signal the intent to decrease travel speed to other drivers on the road without requiring distracting procedures and calculations on behalf of the user.

Again referring to FIGS. 4 and 5, the software instructions may include and execute a control logic algorithm preferably including the first step of requesting receipt of the first output signal 70 from the logic gate 27. Second, the algorithm may request receipt of the second output signal 35 from the distance-detecting sensor 31. The third step is preferably verifying whether the first output signal 70 is true. If the output signal 70 in the third step is true, the fourth step preferably entails the algorithm verifying whether the real-time linear distance 30 is less than the minimum safe linear distance.

If the distance 30 is less than the minimum safe linear distance in step four, the fifth step may include the algorithm generating and transmitting first 36 and second 37 alert signals to the transducers 25 for emitting respective audible and visual 26B warning signals to instruct the trailing vehicle 12 to slow down. This is vital so that the transducer 25 is not activated by a fast approaching trailing vehicle 12 that is at a greater distance than the safe distance behind the leading vehicle 11.

At the same time, the algorithm may generate and transmit an activation signal 38 to the video-recording system 39 for capturing a real-time video of the trailing vehicle 12 while the real-time linear distance 30 remains less than the minimum safe linear distance. This allows the driver to monitor the trailing vehicle 12 without directing attention to the rear of the vehicle or relying on rearview mirrors. In addition, the video-recording system 39 may be employed to collect evidence in the event of a rear end collision caused by the trailing vehicle 12.

Referring again to FIGS. 4 and 5, the control logic algorithm may further include the chronological steps of first calculating a period of time in which the real-time linear distance 30 is less than the minimum safe linear distance. Such minimum safe linear distance preferably is predefined based upon real-time driving and weather conditions respectively. If the period of time is greater than a maximum time interval, the second step of the algorithm may then include generating and transmitting third 40 and fourth 41 alert signals to the transducers 25 for emitting additional audible and visual 26B warning signals instructing the trailing vehicle to slow down. The additional warnings 26 ensure that the trailing vehicle 12 is aware of the posed danger of driving too closely to the leading vehicle 11. The maximum time interval preferably is predefined based upon the real-time driving and weather conditions respectively.

Figure 2:
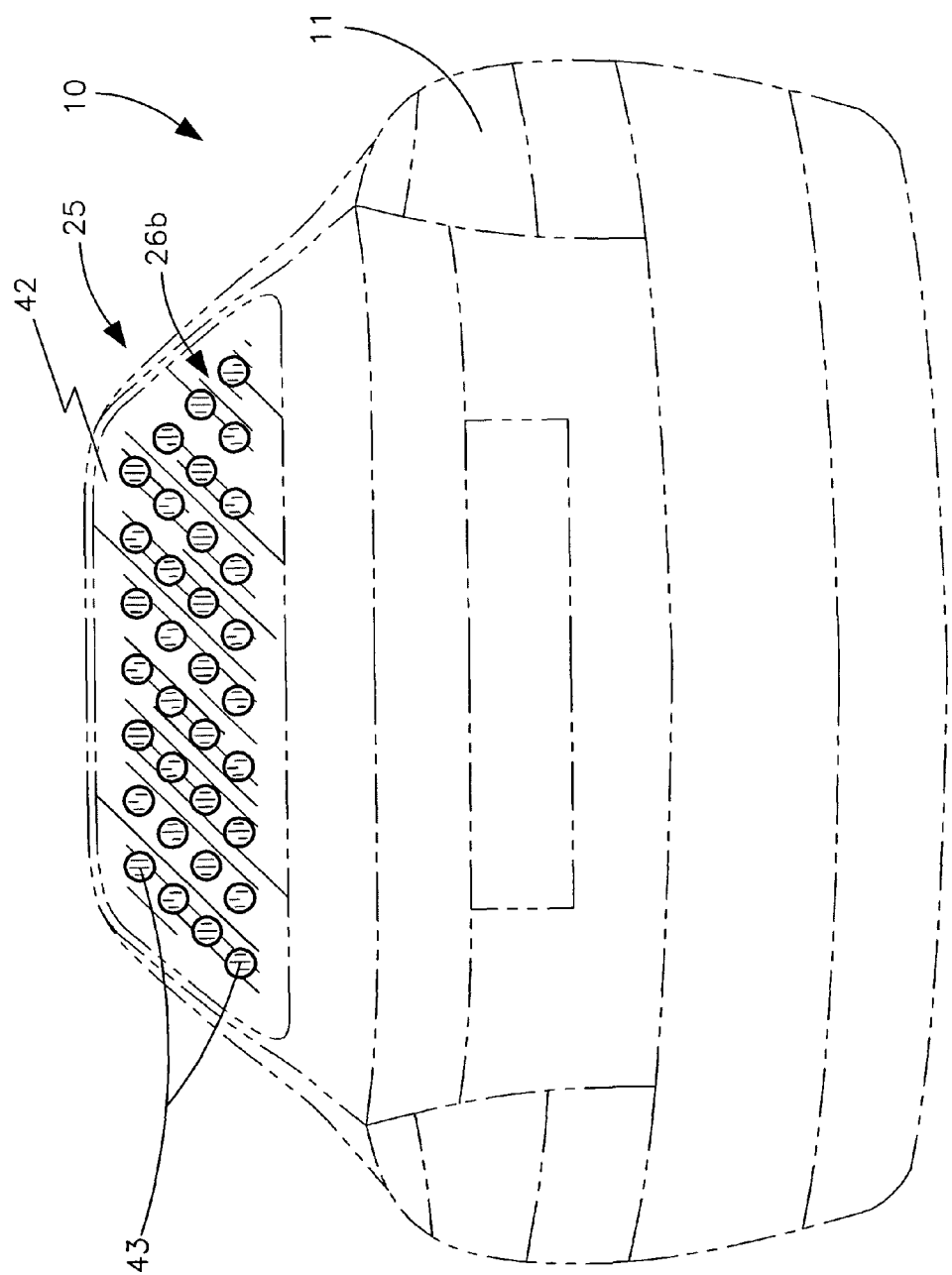
FIG. 2 is a rear elevational view of the leading vehicle employing the present invention with the visual warning signal created by light emitting diodes in an activated mode, in accordance with the preferred embodiment of the present invention.
Figure 3:
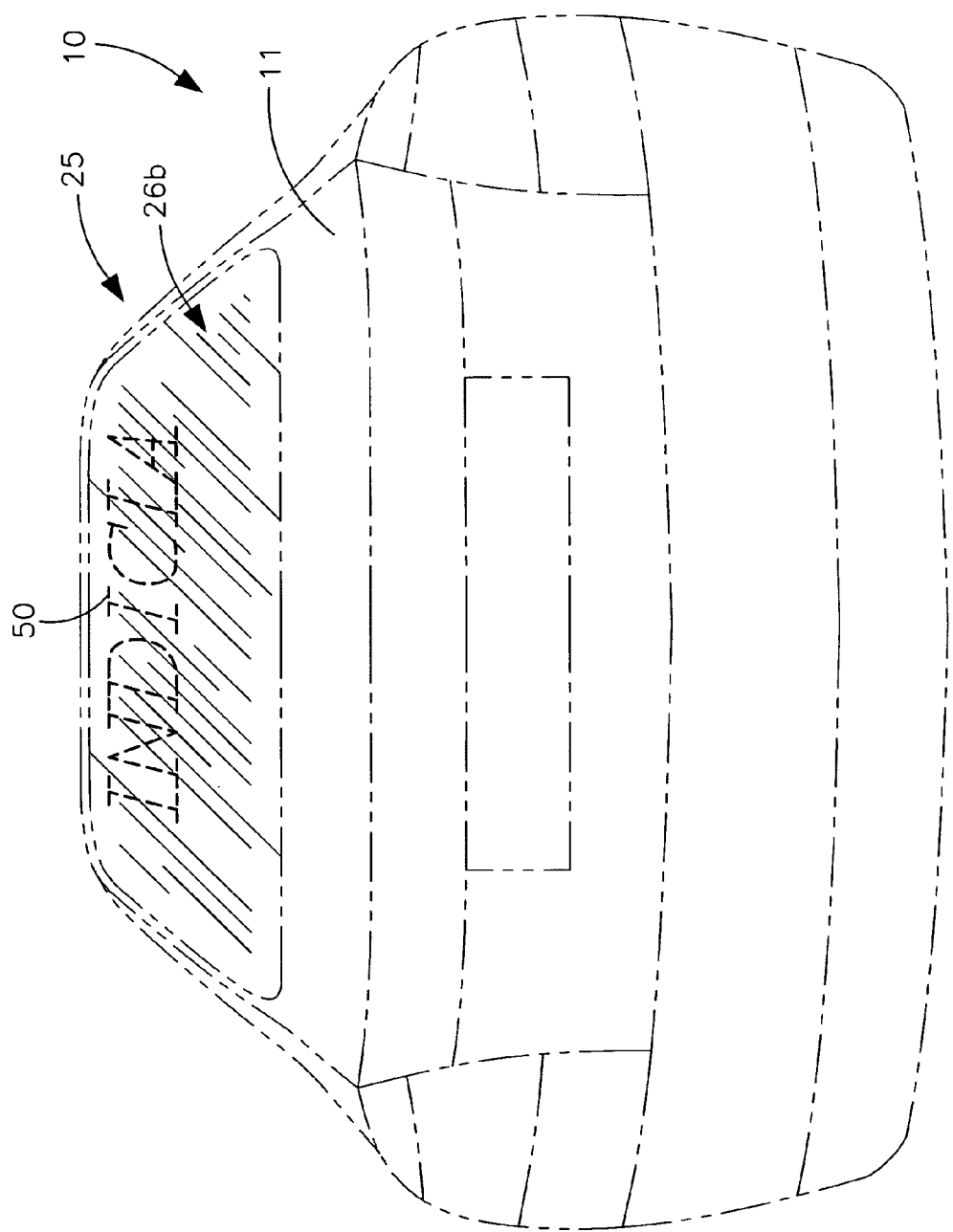
FIG. 3 is a rear elevational view of the leading vehicle employing the present invention with the visual warning signal created by the light emitting diodes formed into an indicia or phrase, in accordance with an alternate embodiment of the present invention.

Referring to FIGS. 1-3, in a preferred embodiment of the system 10 the transducers 25 may further include a light emitting diode message display system 42 that sequentially illuminates selected light emitting diodes 43 for generating a warning message that is visible 26B to the trailing vehicle. However, alternate embodiments of the system 10' may be available where which the visible warning message 26B' may include short phrases 50 directing the trailing vehicle to slow down or increase the distance between vehicles. Additionally, the transducers 25 may include a speaker for generating a pre-recorded audible warning message that is identifiable by the trailing vehicle. The audible warning may assist a driver of the trailing vehicle who may not understand the visual warning.

The automated leading-vehicle message warning system 10 may allow a change in the minimum safe linear distance being directly proportional to a change in the maximum safe traveling speed. This preferably allows an increase and a decrease in the maximum safe traveling speed to cause an increase and a decrease in the minimum safe linear distance respectively. For example, a slower-moving trailing vehicle may safely maintain a shorter distance behind the leading vehicle while a faster moving trailing vehicle may be required to maintain a greater distance behind the leading vehicle.

In this manner, the system 10 may adapt to different driving conditions and will not produce a false alarm in situations such as congested urban traffic, where vehicles are close in proximity to one another as is obvious to one ordinarily skilled in the art. Also, as the leading vehicle is travels faster, the minimum safe distance increases to allow the trailing vehicle proper reaction time to brake before causing an accident.

In use, a method for notifying a trailing vehicle of an unsafe traveling condition behind a leading vehicle. Such a method preferably includes the chronological step of first providing a vehicle speedometer sensor 20. Next, the method may include the vehicle speedometer sensor 20 generating and transmitting true and false first input signals 21 indicating whether a real-time traveling speed of the leading vehicle 11 is above or below a maximum safe traveling speed respectively. Third, the method may include providing a vehicle brake system sensor 22 preferably to monitor when the brakes are quickly and suddenly depressed.

Fourth, the method preferably includes the vehicle brake system sensor 22 generating and transmitting true and false second input signals 23 indicating whether the leading vehicle 11 is decelerating and accelerating respectively. A following step may include providing and housing a plurality of transducers 25 within the leading vehicle 11. The sixth step may include determining whether a real-time traveling condition between the leading 11 and trailing 12 vehicles is a safe traveling condition by detecting whether the trailing vehicle 12 is traveling at a minimum safe linear distance 30 directly behind the leading vehicle 11 upon receipt of the true first 21 and second 23 input signals.

If the real-time traveling conditions are not safe, an additional step of the method may be to then selectively toggle the transducers 25 to respective activate modes. Finally, the method may include each of the transducers 25 generating and transmitting a unique warning signal 26 when the trailing vehicle 12 fails to maintain the minimum safe distance from the leading vehicle during the unsafe traveling condition.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automated leading-vehicle message warning system for notifying a trailing vehicle of an unsafe traveling condition, said automated leading-vehicle message warning system comprising:

a vehicle speedometer sensor for generating and transmitting true and false first input signals indicating whether a real-time traveling speed of the leading-vehicle is above or below a maximum safe traveling speed respectively;

a vehicle brake system sensor for generating and transmitting true and false second input signals indicating whether the leading vehicle is decelerating and accelerating respectively;

means for determining whether a real-time traveling condition between the leading and trailing vehicles is a safe traveling condition by detecting whether the trailing vehicle is traveling at a minimum safe linear distance directly behind the leading vehicle upon receipt of said true first and second input signals; and a plurality of transducers housed at the leading vehicle and being selectively toggled to respective activate modes such that each of said transducers generates and transmits a unique warning signal respectively.

2. The automated leading-vehicle message warning system of claim 1, wherein said safe traveling condition determining means comprises:

a logic gate communicatively coupled directly to said vehicle speedometer sensor and said vehicle brake system sensor respectively, said logic gate generating and transmitting a true first output signal upon receipt of said true first signal and said true second signal respectively, said logic gate further generating and transmitting a false first output signal upon receipt of either of said false first signal and said false second signal respectively;

a distance-detecting sensor for generating and transmitting a second output signal indicating a real-time linear distance between the leading and trailing vehicles when said real-time traveling speed is above the maximum safe traveling speed;

a processor communicatively coupled directly to said logic gate and said distance-detecting sensor respectively; and a memory communicatively coupled to said processor, said memory including programmable software instructions that instructs said transducers to sequentially alert the trailing vehicle of the unsafe driving condition.

3. The automated leading-vehicle message warning system of claim 2, wherein said software instructions comprise and execute a control logic algorithm including the chronological steps of:

a. requesting receipt of said first output signal from said logic gate;

b. requesting receipt of said second output signal from said distance-detecting sensor;

c. verifying whether said first output signal is true;

d. if step c. is yes, verifying whether said real-time linear distance is less than said minimum safe linear distance; and e. if step d. is yes, performing the following steps
  i. generating and transmitting first and second alert signals to said transducers for emitting respective audible and visual warning signals to instruct the trailing vehicle to slow down, and
  ii. generating and transmitting an activation signal to said video-recording system for capturing a real-time video of the trailing vehicle while said real-time linear distance remains less than the minimum safe linear distance.

4. The automated leading-vehicle message warning system of claim 3, wherein said control logic algorithm further includes the chronological steps of:

a: calculating a period of time in which said real-time linear distance is less than said minimum safe linear distance, wherein said minimum safe linear distance is predefined based upon real-time driving and weather conditions respectively; and b. if said period of time is greater than a maximum time interval, then generating and transmitting third and fourth alert signals to said transducers for emitting additional audible and visual warning signals to instruct the trailing vehicle to slow down, wherein said maximum time interval is predefined based upon the real-time driving and weather conditions respectively.

5. The automated leading-vehicle message warning system of claim 4, wherein said transducers comprise:

a light-emitting diode message display system that sequentially illuminates selected diodes for generating a warning message that is visible to the trailing vehicle; and a speaker for generating a pre-recorded audible warning message that is identifiable by the trailing vehicle.

6. The automated leading-vehicle message warning system of claim 5, wherein a change in said minimum safe linear distance is directly proportional to a change in said maximum safe traveling speed such that an increase and a decrease in said maximum safe traveling speed causes an increase and a decrease in said minimum safe linear distance respectively.

7. An automated leading-vehicle message warning system for notifying a trailing vehicle of an unsafe traveling condition, said automated leading-vehicle message warning system comprising:

a vehicle speedometer sensor for generating and transmitting true and false first input signals indicating whether a real-time traveling speed of the leading-vehicle is above or below a maximum safe traveling speed respectively;

a vehicle brake system sensor for generating and transmitting true and false second input signals indicating whether the leading vehicle is decelerating and accelerating respectively;

means for determining whether a real-time traveling condition between the leading and trailing vehicles is a safe traveling condition by detecting whether the trailing vehicle is traveling at a minimum safe linear distance directly behind the leading vehicle upon receipt of said true first and second input signals; and a plurality of transducers housed at the leading vehicle and being selectively toggled to respective activate modes such that each of said transducers generates and transmits a unique warning signal when the trailing vehicle fails to maintain the minimum safe distance from the leading vehicle during the unsafe traveling condition.

8. The automated leading-vehicle message warning system of claim 7, wherein said safe traveling condition determining means comprises:

a logic gate communicatively coupled directly to said vehicle speedometer sensor and said vehicle brake system sensor respectively, said logic gate generating and transmitting a true first output signal upon receipt of said true first signal and said true second signal respectively, said logic gate further generating and transmitting a false first output signal upon receipt of either of said false first signal and said false second signal respectively;

a distance-detecting sensor for generating and transmitting a second output signal indicating a real-time linear distance between the leading and trailing vehicles when said real-time traveling speed is above the maximum safe traveling speed;

a processor communicatively coupled directly to said logic gate and said distance-detecting sensor respectively; and a memory communicatively coupled to said processor, said memory including programmable software instructions that instructs said transducers to sequentially alert the trailing vehicle of the unsafe driving condition.

9. The automated leading-vehicle message warning system of claim 8, wherein said software instructions comprise and execute a control logic algorithm including the chronological steps of:
   a. requesting receipt of said first output signal from said logic gate;
   b. requesting receipt of said second output signal from said distance-detecting sensor;
   c. verifying whether said first output signal is true;
   d. if step c. is yes, verifying whether said real-time linear distance is less than said minimum safe linear distance; and
   e. if step d. is yes, performing the following steps
      i. generating and transmitting first and second alert signals to said transducers for emitting respective audible and visual warning signals to instruct the trailing vehicle to slow down, and
      ii. generating and transmitting an activation signal to said video-recording system for capturing a real-time video of the trailing vehicle while said real-time linear distance remains less than the minimum safe linear distance.

10. The automated leading-vehicle message warning system of claim 9, wherein said control logic algorithm further includes the chronological steps of:
   a. calculating a period of time in which said real-time linear distance is less than said minimum safe linear distance, wherein said minimum safe linear distance is predefined based upon real-time driving and weather conditions respectively; and
   b. if said period of time is greater than a maximum time interval, then generating and transmitting third and fourth alert signals to said transducers for emitting additional audible and visual warning signals to instruct the trailing vehicle to slow down, wherein said maximum time interval is predefined based upon the real-time driving and weather conditions respectively.

11. The automated leading-vehicle message warning system of claim 10, wherein said transducers comprise:
   a light-emitting diode message display system that sequentially illuminates selected diodes for generating a warning message that is visible to the trailing vehicle; and
   a speaker for generating a pre-recorded audible warning message that is identifiable by the trailing vehicle.

12. The automated leading-vehicle message warning system of claim 11, wherein a change in said minimum safe linear distance is directly proportional to a change in said maximum safe traveling speed such that an increase and a decrease in said maximum safe traveling speed causes an increase and a decrease in said minimum safe linear distance respectively.

13. A method for notifying a trailing vehicle of an unsafe traveling condition behind a leading vehicle, said method comprising the chronological steps of:
   a. providing a vehicle speedometer sensor;
   b. said vehicle speedometer sensor generating and transmitting true and false first input signals indicating whether a real-time traveling speed of the leading-vehicle is above or below a maximum safe traveling speed respectively;
   c. providing a vehicle brake system sensor;
   d. said vehicle brake system sensor generating and transmitting true and false second input signals indicating whether the leading vehicle is decelerating and accelerating respectively;
   e. providing and housing a plurality of transducers within the leading vehicle;
   f. determining whether a real-time traveling condition between the leading and trailing vehicles is a safe traveling condition by detecting whether the trailing vehicle is traveling at a minimum safe linear distance directly behind the leading vehicle upon receipt of said true first and second input signals;
   g. if said real-time traveling conditions is not a safe traveling condition, then selectively toggling said transducers to respective activate modes; and
   h. each of said transducers generating and transmitting a unique warning signal when the trailing vehicle fails to maintain the minimum safe distance from the leading vehicle during the unsafe traveling condition.

* * * * *